United States Patent [19]

Batz

[11] 3,967,202
[45] June 29, 1976

[54] DATA TRANSMISSION SYSTEM INCLUDING AN RF TRANSPONDER FOR GENERATING A BROAD SPECTRUM OF INTELLIGENCE BEARING SIDEBANDS

[75] Inventor: James E. Batz, Northbrook, Ill.
[73] Assignee: Northern Illinois Gas Company, Aurora, Ill.
[22] Filed: July 25, 1974
[21] Appl. No.: 491,829

[52] U.S. Cl. .................................... 325/31; 325/64; 325/65; 325/131; 340/152 T; 343/6.8 R
[51] Int. Cl.² ...................... H04B 1/59; G01S 9/56
[58] Field of Search ................. 325/15, 17, 31, 8, 1, 325/2, 3, 64, 131, 145, 147, 163, 65; 343/6.5 R, 6.5 LC, 6.5 SS, 6.8 R, 6.8 LC, 225, 227; 340/152 T, 151; 178/66 R, 66 A

[56] References Cited
UNITED STATES PATENTS

| | | | |
|---|---|---|---|
| 2,380,959 | 8/1945 | Frankel | 178/66 |
| 2,422,664 | 6/1947 | Feldman | 325/65 |
| 2,839,604 | 5/1958 | Shank | 178/66 |
| 3,058,065 | 10/1962 | Freeman et al. | 325/31 |
| 3,493,865 | 2/1970 | Miller | 325/30 |
| 3,705,385 | 12/1972 | Batz | 340/152 R |

*Primary Examiner*—Robert L. Griffin
*Assistant Examiner*—Marc E. Bookbinder
*Attorney, Agent, or Firm*—Johnson, Dienner, Emrich & Wagner

[57] ABSTRACT

A data transmission system for obtaining information from a plurality of data sources includes an interrogate source for transmitting RF interrogate signals to the locations of the data sources and a transponder associated with each data source for receiving the interrogate signals and for generating RF reply signals representing the information. The transponder includes a transmitter having a voltage controlled oscillator responsive to data signals at first and second levels to generate sinusoidal output signals at first and second frequencies, respectively, a wave shaping circuit which converts the output signals to sawtooth wave signals at the corresponding frequencies and an FM oscillator for providing a carrier signal which is modulated by the sawtooth signals to produce a broad spectrum of sideband signals of approximately equal amplitude.

22 Claims, 18 Drawing Figures

FIG. 3A

TRANSMITTER OUTPUT SPECTRUM

TRANSMITTER OUTPUT SPECTRUM

DATA TRANSMISSION SYSTEM INCLUDING AN RF TRANSPONDER FOR GENERATING A BROAD SPECTRUM OF INTELLIGENCE BEARING SIDEBANDS

BACKGROUND OF THE INVENTION

1. Field of the invention.

This invention relates to data readout systems, and more particularly, to a data readout system employing a radio frequency data link to permit the transmission of data between an interrogate source and a plurality of data sources located remotely from the interrogate source.

2. Description of the prior art.

Various types of data transmission systems have been proposed for the purpose of obtaining information from a plurality of remote data sources. Certain ones of these systems employ direct communication links established over electrical power lines or telephone lines, for example, connected between transponders associated with the data sources and interrogate apparatus at the interrogate source which controls the readout of the information provided at the data sources.

Other systems have employed wireless communication links to enable the transfer of data from a plurality of data sources to an interrogate source. In the case of wireless data transmission systems, the interrogate source includes a transmitter which generates amplitude or frequency modulated interrogate signals for transmission to the locations of the data sources to be interrogated. Each data source has an associated transponder which includes a receiver for receiving the interrogate signal. The receiver is responsive to the interrogate signals to enable data signals representing the information provided by the data sources to control a transmitter of the transponder to generate reply data signals representing the information. Where amplitude or frequency modulated signals are used, the transmitter includes an oscillator which generates a carrier signal at a given frequency which is modulated by tone signals to provide modulated signals coded to represent the information to be transmitted to the interrogate source. The interrogate source includes a receiver tuned to receive the reply signals.

Where the transmitter is operating in the UHF frequency band or higher a typical oscillator stability could result in transmitter frequency variations on the order of 4 MHz. A conventional receiver having a bandwidth of 25 KHZ would experience some difficulty in locating the transmitted signal. If the receiver bandwidth were increased, a decrease in sensitivity would result and the possibility of interfering signals being in the bandpass with the desired signal would also be increased.

Thus a crystal controlled oscillator is normally required to enable the generation of reply signals at a known frequency to assure proper reception of the signals by the interrogate source receiver.

To enhance the detection capabilities of the interrogate source receiver, it is desirable to provide multiple reply signals. In systems employing transponders having conventional FM transmitters, the carrier signal is usually modulated by a sine wave signal.

This process generates a carrier and several sidebands, the amplitude and number of which is determined by the modulation index. to recover the original modulating frequency requires the demodulating receiver have a bandpass sufficient to receive all predominant sidebands transmitted. Sidebands having an amplitude less than 1% of the unmodulated carrier are usually ignored. Where a higher degree of distortion of the demodulated signal can be tolerated only the predominant sidebands need be considered. It is evident that for the transmitted signal to be properly detected, the receiver must have sufficient bandwidth and be precisely tuned to the transmitter frequency. It is also important that the modulation index of the transmitter (the ratio of the transmitter carrier deviation to the modulation frequency) be sufficiently stable. Should the modulation index increase substantially, the receiver bandpass will be insufficient to receive the predominant sidebands and distortion of the demodulated signal will result. Receiver tuning will also become more critical. Should the modulation index decrease, a higher signal level will be required at the receiver input to provide the same signal-to-noise ratio out of the discriminator.

When the interrogate source, for example, is moving relative to the transponder, peaks and nulls in the received signals occur as a result of the arrival of several rays each traveling over a different path length to the interrogate source receiver from the transponder transmitter. When such rays arrive in phase a peak in the received signal occurs. When such rays are 180° out of phase, a null occurs. A difference in path length between the direct and reflected ray of one-half wavelength is all that is required to cause the received signal to go from a peak to null. This corresponds to a distance difference of 0.375 meters at a transmitter frequency of 400 MHz. Since these nulls and peaks are frequency dependent, a null can occur at one frequency whereas a peak can occur at a frequency 4 MHz away, depending on the path length.

Accordingly, it would be desirable to provide a remote readout system which enables the transmission of data from a data source to an interrogate source wherein data recovery is not dependent upon transmitter and receiver stability and wherein the effects of interference and signal level variation with motion are minimized.

SUMMARY OF THE INVENTION

It is an object of the present invention to provide a remote data readout system wherein a broad spectrum of redundant information representing data to be recovered is transmitted from at least one data source to an interrogate source.

Another object of the invention is to provide a wireless data transmission system wherein data is frequency modulated onto a carrier producing a broad spectrum of intelligence bearing sidebands of the carrier and in which a plurality of such sidebands may be continuously detected by a receiver without suppression of the intelligence.

It is another object to provide a wireless data transmission system which minimizes the effect of interference in the transmission and reception of data.

Another object of the invention is to provide a wireless data transmission system in which reception is independent of variations in transmitter frequency.

It is yet another object of the present invention to provide a modified FM transmitter which generates a plurality of sidebands of the carrier frequency which are approximately equal in amplitude over a broad spectrum.

These and other objects are achieved by the present invention which has provided a data readout system employing a wireless communication link to enable the transmission of data between an interrogate source and a plurality of data sources which are at locations remote from the interrogate source.

In accordance with one embodiment, the data transmission system includes an interrogate source means having transmitter means operable to generate RF interrogate signals for transmission to a plurality of data sources at locations remote from the interrogate source. Each data source has an associated transponder means which includes a receiver means for receiving the RF interrogate signals and control logic means controlled by the receiver means for providing logic level data signals in a sequence coded to represent the information provided by the corresponding data source. The data signals in turn are used to control a transmitter means of the transponder means to effect the generation of reply signals for transmission to the interrogate source means.

In accordance with the invention, the transponder transmitter comprises a modified FM transmitter which is controlled by the coded data signals provided by the control logic means to generate a broad spectrum of redundant reply signals representing the information for transmission to the interrogate source means.

In a disclosed embodiment, the transmitter includes an FM oscillator means which generates a carrier signal at a given frequency. The transmitter further includes a voltage controlled oscillator means which provides modulating signals for the FM oscillator means. The voltage controlled oscillator means is controlled by the logic level data signals representing the information provided by the data source to provide sine wave modulatin signals at first and second frequencies. A wave shaping means shapes the sine wave output of the voltage controlled oscillator means into to sawtooth voltage waveform at the modulating frequencies which is supplied as a modulating drive to the FM oscillator means. The sawtooth modulating drive signals effect the generation of a plurality of sidebands of the carrier, the sidebands being separated by the modulating frequency. Sidebands at a first group of frequencies are provided to represent each logic 1 data signal and sidebands at a second group of frequencies are provided to represent each logic 0 data signal. The transponder transmitter means provides a broad spectrum of approximately uniform sideband amplitude.

Data is recovered by passing any two adjacent sidebands through a common receiver at the interrogate source means, where their difference frequency is further demodulated. The receiver means can be tuned anywhere in the transmitted spectrum to receive the transmitted data. The passband of the receiver is of sufficient bandwidth to assure that at least two sidebands are received at all times. The use of sawtooth modulation also allows three sidebands to be within the receiver passband without interference. In addition, only a portion of the sideband spectrum, need be received in order to recover the transmitted information. In contrast, in conventional FM transmission systems, all predominant sidebands must be received for the transmitted signal to be properly detected.

Data recovery is not dependent upon transmitter or receiver stability. Also, reception of the data is achieved without prior knowledge of the exact tramsitting frequency.

As stated previously, one advantage of the use of a sawtooth modulating drive as provided by the present invention is the elimination of precise frequency control of the transmitter frequency. The associated receiver in the data link need only be tuned to receive any two (or three) of the multitude of sidebands transmitted. Where other interfering signals are present, one need only tune the receiver to a different part of the spectrum transmitted.

In addition, transmitting a broad spectrum of redundant information affords a convenient method of circumventing interference and multipath problems normally associated with single frequency transmitters. For example. where one of the terminals in the data link is moving, peaks and nulls may occur depending upon path length for direct and reflected signals. In the event of loss of signal, as a result of such distructive interference, the receiver can be returned to a different part of the spectrum enabling proper reception of the data.

The redundant nature of the signal transmitted allows several receiver channels to be processed simultaneously. Data errors caused by noise or interference in one channel will usually not occur simultaneously in other channels. Data from several channels can be correlated to improve data reliability.

DESCRIPTION OF PREFERRED EMBODIMENTS

General Description

Figure 1:
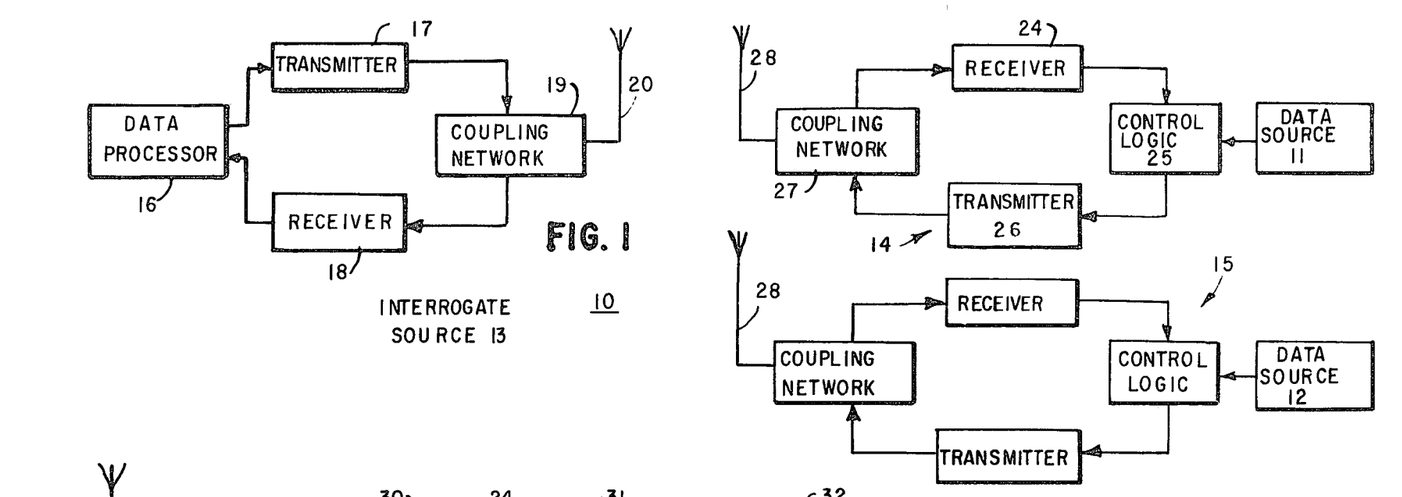
FIG. 1 is a block diagram of a data transmission system including an interrogate source and a plurality of data sources and associated transponders, provided by the present invention.

Referring to FIG. 1, there is shown a simplified block diagram of a data transmission system 10 which provides a two-way radio link between a plurality of data sources, such as data sources 11 and 12, and an interrogate source 13 at a control location. The interrogate source 13 generates RF interrogate signals for transmission to the locations of the data sources 11 and 12 to effect the readout of data provided by the data sources 11 and 12. By way of example, the data sources 11 and 12 may comprise utility meters, register-type counters associated with office machines, or any other type of apparatus which registers data.

Each data source has a transponder associated therewith, such as transponders 14 and 15, which are associated with data sources 11 and 12, respectively, which enable the RF link to be established between the data sources 11 and 12 and the interrogate source 13. In applications wherein data provided by a plurality of data sources is to be read out by a common interrogate source, each data source is assigned a unique identification number or address. The interrogate source generates coded signals representing the address for a data source selected to be read out for transmission to the location of the data sources. The selected transponder responsively enables the data provided by the associated data source to be transmitted to the interrogate source 13.

As shown in FIG. 1, the interrogate source 13 includes a data processor 16, a transmitter 17 and a receiver 18. The data processor 16 supplies the address of a data source selected to be interrogated to the transmitter 17 which responsively generated RF interrogate signals coded to represent such address. By way of illustration, the transmitter 17 may generate RF carrier signals at 451 MHz which are amplitude modulated by 3KHz or 2KHz tones to provide the coded interrogate signals. It is pointed out that the carrier and modulating frequencies illustrated are by way of example and other frequency values may be employed rather than those described.

The modulated interrogate signals thus provided are extended over a coupling network 19 to an antenna 20 of the interrogate source 13 for radiation to the locations of the data sources 11 and 12. The interrogate source 13 also includes a receiver 18, which is coupled to the antenna 20 over the coupling network 19, for receiving reply data signals transmitted by the transponders 14 and 15 associated with the data sources 11 and 12. The receiver 18 converts the reply data signals to logic level signals coded to represent the information by the data source and extends the logic level data to the data processor 16.

Each transponder such as transponder 14 includes a receiver 24, a data control logic circuit 25 and a transmitter 26. The input of the receiver 24 is connected over a coupling network 27 to an antenna 28 of the transponder 14. The receiver 24 receives the interrogate signals and recovers the 2KHz and 3KHz data from the interrogate signals. The output of the receiver 24 is connected to an input of the data control logic 25 which controls the transfer of data from the data source 11 to the transmitter 26. The transmitter 26 responsively generates frequency modulated reply data signals coded to represent the data provided by the data source 11. The reply data signals generated by the transmitter 26 are coupled to the transponder antenna 28 over the coupling network 27 and radiated to the interrogate source 13.

One known system for enabling the transmission of data provided by utility meters, for example, is disclosed in my U.S. Pat. No. 3,705,385 which is incorporated herein by reference. The referenced patent discloses an interrogate source transmitter arrangement and a transponder receiving arrangement which are suitable for use in the data transmission system of the present invention. As will become apparent hereinafter, the transponders 14 and 15 each include a novel transmitter 26, provided in accordance with the present invention, which is operable to generate multiple reply signals consisting of sidebands of the carrier frequency provided by the transmitter 26. In addition, the interrogate source 13 includes a receiver 18 which is compatible with the transmitter 26 of the transponder 14.

Transponder

Figure 2:
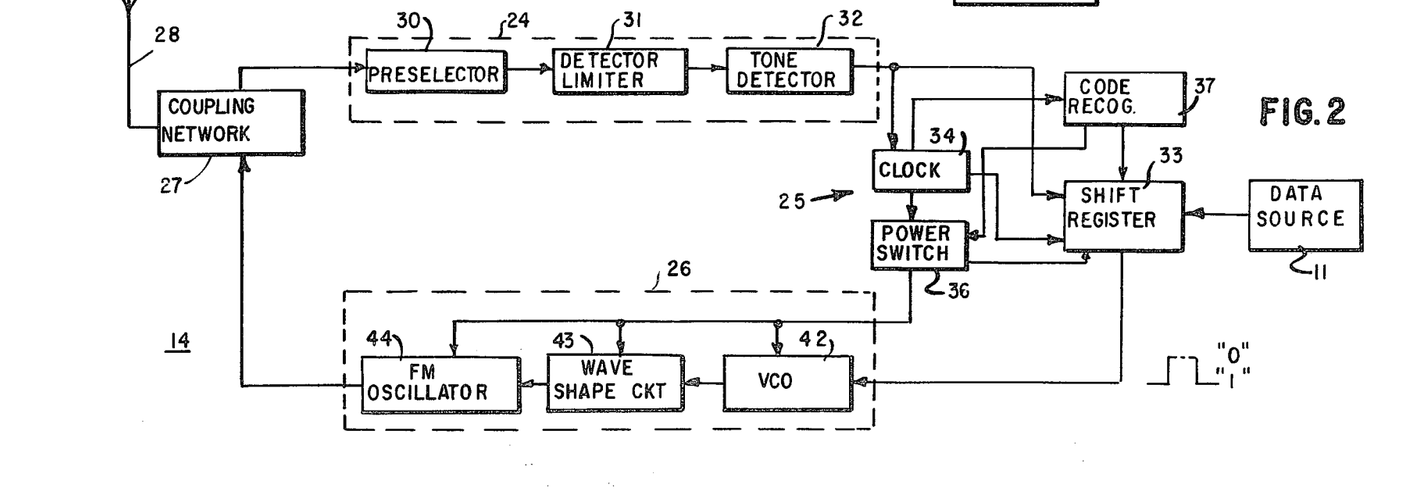
FIG. 2 is a block diagram of a transponder of the data transmission system shown in FIG. 1, which includes a transmitter provided by the present invention.

Referring to FIG. 2, the interrogation signals transmitted from the interrogate source 13 are received at all the transponders within range of transmission of the interrogate source 13. It is pointed out that the interrogate source may be fixed or mobile, in the latter case, the interrogating and processing apparatus being carried in a van, aircraft or any other mobile type equipment capable of transporting such equipment.

Each transponder, such as transponder 14, includes an antenna 28 connected to a coupling network 27. The interrogation signals pass through a preselector 30 to an RF detector-limiter circuit 31 where the address data is separated from the 451MHz carrier signals.

The preselector 30 passes the interrogating carrier and its sidebands with a minimum of attenuation and supresses signals removed in frequency from the desired carrier. The detected signals consisting of 3KHz tone bursts and 2KHz tone bursts which represent, respectively, the logic 1 and logic 0 coding of the identification number of the selected data source, pass from the output of the detector-limiter 31 to a tone detector circuit 32 which separates the logic 1 signals from the logic 0 signals.

The data control logic circuits 25 of the transponder 14 include a shift register 33 for storing, temporarily, the data bits which comprise the identification data transmitted from the interrogate source 13. The data bits are entered into the shift register 33 serially and advanced from the first stage to the last stage by clock pulses provided by a clock pulse generator 34. The clock pulse generator 34 is responsive to signals at the outpout of tone detector 32 to provide the clock pulses for gating the data signals through the shift register 33. The clock pulse generator circuit 34 also provides an enabling pulse for operating a power switch 36 which supplies power to the shift register 33.

When the first data pulse is received and passed to the tone detector 32, the clock pulse generator 34 provides a gating pulse for gating data into the shift register 33 and an enable signal to energize the power switch 36. The power switch 36 supplies operating power to the shift register 33 each time data signals are received at the transponder 14. Thus, each transponder within receiving range of the interrogate source 13 has power applied to its corresponding shift register 33 in response to signals transmitted from the interrogate source 13.

The power switch 36 remains operated for a predetermined time after the last data bit has been received after which time the power switch turns off until a subsequent input is detected by the transponder 14.

Only the data source selected to be interrogated is enabled to transmit data to the interrogate source 13. This function is provided by way of code recognition circuits 37. As is more fully described in my earlier patent, referenced above, when the received address is identical to an address stored by the code recognition circuits 37, a code recognition signal is provided which enables the transfer of the information provided by the data source 11 into the shift register 33.

The code recognition circuits 37 also provides a signal which energizes a transmitter latch circuit (not shown) of the power switch circuit 36 which supplies power to the transmitter 26. The transmitter 26, when energized, remains operative for a time sufficient to assure transmission of the data stored in the shift register 33. When the power switch turns off, the transmitter 26 is deenergized. After the address data has been transmitted from the interrogate source to the transponder 14, the data processor 16 effects the generation of a series of further amplitude modulated signals. The carrier signals are modulated with a 3 KHz tone and are used to effect the readout of the data stored in the shift register 33 of the transponder 14. The readout of the data stored in the shift register 33 is controlled from the interrogate source 13.

The amplitude modulated readout signals transmitted are passed through the preselector 30 to the detector-limiter 31 where the information is recovered from the 451 MHz carrier signals. The 3 KHz tone burst signal output from the detector-limiter 31 is passed to the clock pulse generator to provide clock signals to the shift register 33. As the readout signals are gated into the shift register 33, the data pulses stored in the shift register 33 are shifted out of the register 33 and passed to the input of the transmitter 26.

Transponder Transmitter

The transponder transmitter 26 basically comprises a frequency modulated oscillator. As shown in FIG. 2, the transmitter 26 includes a voltage controlled oscillator 42, a wave shaping circuit 43 and as FM oscillator 44. In an exemplary embodiment, the FM oscillator 44 is operable when enabled to generate carrier signals at a frequency of 400 MHz. The voltage controlled oscillator 42 provides a sinusoidal output at a frequency of 200 KHz. The output of the voltage controlled oscillator 42 is shifted between 195 and 205 KHz by the two level data signal provided as data bits are shifted out of the shift register 33. The frequency 195 KHz corresponds to a logic 0 level and the frequency 205 KHz corresponds to a logic 1 level. While in the exemplary embodiment a carrier frequency of 400 MHz is employed, other carrier frequencies may be used. Also, the modulating frequency may be higher or lower than 200 KHz if it is desired to provide greater or less separation between the sidebands generated.

Figure 3A:
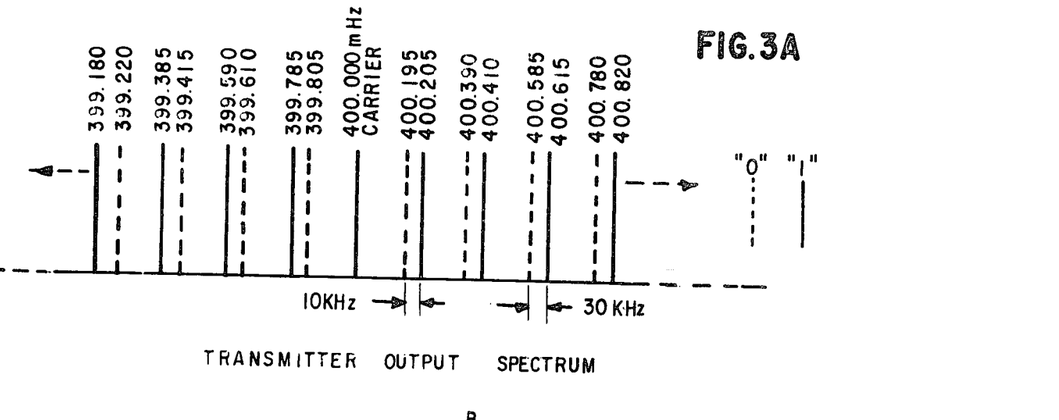
FIG. 3A is a simplified representation of the output spectrum of the transmitter shown in FIG. 2.

The sine wave output from the 200 KHz oscillator 42 is shaped into a sawtooth voltage waveform by the wave shaping circuit 43 to provide a linearly varying modulating drive signal for the FM oscillator 44, such that the carrier signals generated by the FM oscillator 44 are frequency modulated, producing a series of sidebands. Each sideband is separated from the carrier by the modulating frequency. In FIG. 3A, there is shown the sidebands generated by the 400 MHz FM oscillator 44 as its frequency is deviated by the 195–205 KHz sawtooth modulating waveform. Only eight of the sidebands for each of the two modulating frequencies are shown in FIG. 3A. The sidebands generated for each of the modulating frequencies are separated from the carrier frequency by integral multiples of the modulating frequency. Through the use of the wave shaping circuit 43 which provides a sawtooth voltage waveform for supplying drive to the FM oscillator 44, the sidebands are of substantially the same amplitude and are not affected by the amount of carrier frequency deviation or changes in the modulating frequency, which could vary in normal operation.

Figure 4:
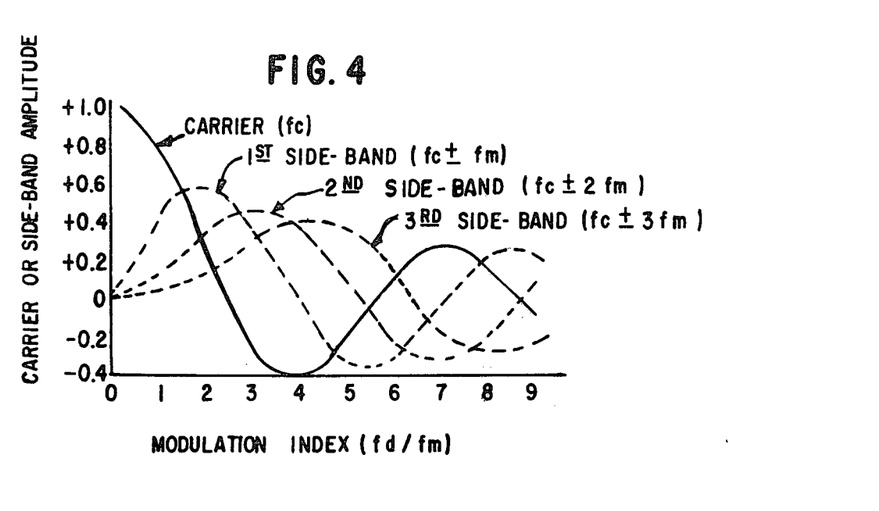
FIG. 4 is a graphical representation of the variation of carrier and sideband amplitudes of an FM transmission against modulation index.

Digressing, in the case where a carrier is frequency modulated by a sine wave, a series of sidebands is generated as shown in FIG. 3A. Each sideband is separated from the carrier by the modulating frequency. However, the amplitude of each sideband is determined by the ratio of the deviation frequency to the modulating frequency, commonly referred to as the modulation index. A classical graph of carrier and sideband amplitude as a function of modulation index is shown in FIG. 4. It can be seen that when the modulating frequency is held constant, a wide variation on carrier and sideband amplitudes occurs as the deviating frequency is increased.

The provision of sawtooth wave drive signals in accordance with the present invention provides sideband amplitudes which are nearly equal and which are not affected by the amount of carrier frequency deviation or modulating frequency. Preferably the sawtooth waveform has a risetime/falltime ratio of 10 to 20. Sawtooth modulation also allows three sidebands to be within the passband of the interrogate source receiver 18 without interference. That is, any pair of adjacent sidebands may be detected to recover the transmitted intelligence without suppression of the modulating component. When sine or triangular wave modulation of a carrier is used, the relative phasing of the sidebands is such that cancellation would result when three sidebands are within the receiver bandpass, resulting in suppression of the 200 KHz intelligence.

Thus, the transponder transmitter 26 provides multiple reply signals of known frequency. The provision of multiple reply signals is desirable as a means of combating cochannel interference at the interrogate source receiver 18. Also, proper reception of the transmitter reply signals by the interrogate source receiver 18 is achieved without prior knowledge of the exact frequency of the transmitted signal.

DETAILED DESCRIPTION

Voltage Controlled Oscillator

Figure 5:
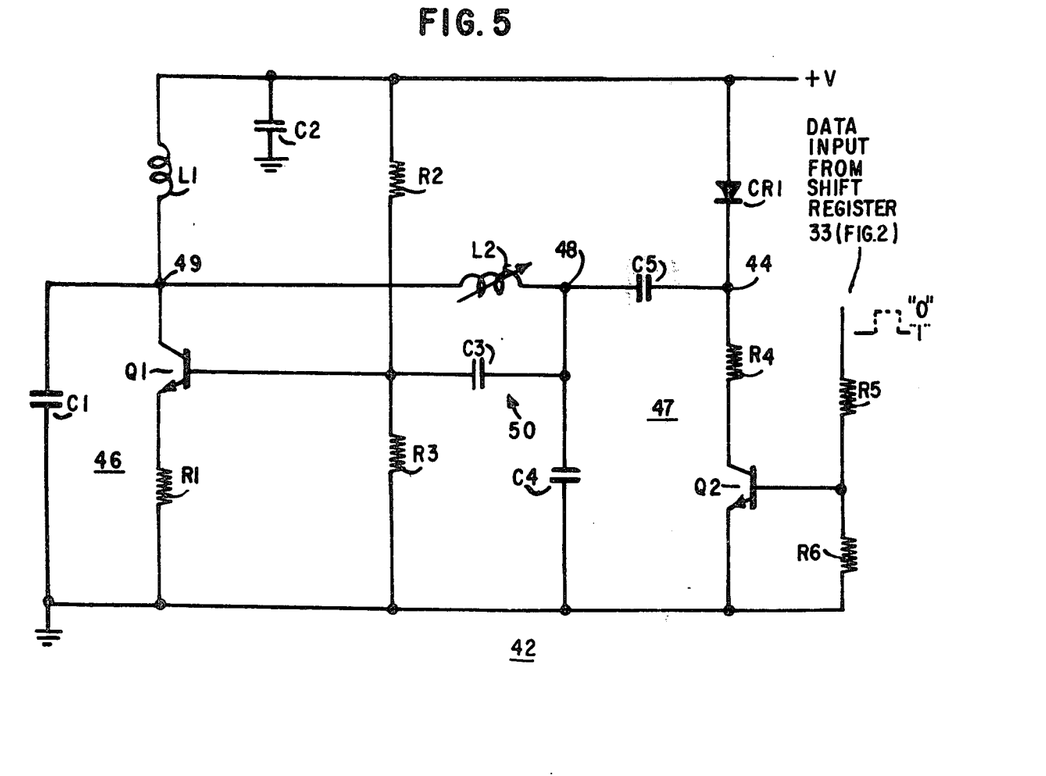
FIG. 5 is a schematic circuit diagram for a voltage controlled oscillator of the transmitter shown in FIG. 2.

Referring to FIG. 5, there is shown a schematic circuit diagram of the voltage controlled oscillator 42. The oscillator 42 includes an oscillator section 46 comprising a transistor Q1 and frequency determining components including inductor L2 capacitors C1 and C4 which establish the operating frequency at 200 KHz. The oscillator 42 also includes a control section 47 comprising transistor Q2 and capacitor C5 which provides a frequency shift of 10 KHz in the output frequency when being modulated by the data bits shifted out of the shift register 33 which data bits are extended to the base of transistor Q2.

Transistor Q2 has a base electrode connected to the junction of a pair of resistors R5 and R6 which are serially connected between the output of the shift register 33 and ground. A voltage +V is supplied to the collector of transistor Q2 over a diode CR1 and a resistor R4 which are serially connected between a conductor +V which serves as AC ground, and the collector of transistor Q2. The emitter of transistor Q2 is connected to ground. As indicated above, the transmitter 26 is normally unenergized and whenever data is to be transmitted, power is applied over conductor +V to the circuits of the transmitter 26, such as the voltage controlled oscillator 42, by the power switch 36.

A capacitor C5 is connected between the junction 44 of diode CR1 and resistor R4 and point 48 to the tuning circuit 50 of the oscillator section 46 which includes inductor L2 and capacitors C1 and C4. Capacitor C4 is connected between point 48 and ground. Inductor L2 is connected between point 48 and the collector of transistor Q1 at point 49. Capacitor C1 is connected between the collector and the emitter of transistor Q1. The collector of transistor Q1 is also connected over inductor L1 to conductor +V.

Inductor L2 is variable to permit adjustment of the operating frequency for the oscillator 42. Resistors R1–R3 establish a bias level for transistor Q1, the base of transistor Q1 being connected to the junction of resistors R2 and R3 which are serially connected between conductor +V and ground and the emitter of transistor Q1 being connected over resistor R1 to ground. A coupling capacitor C3 is connected from point 48 to the base of transistor Q1.

Temperature compensation is not required for the oscillator circuit 42 since the bandwidth of the interrogate source receiver 18 is sufficient to handle the small frequency variations experienced over the operating range of temperatures.

In operation, assuming the output of the shift register 33 is low or at a logic 1 level, then when power is applied to condutor +V, transistor Q2 is cutoff, effectively disconnecting capacitor C5 at point 44, from the tuned circuit 50 of oscillator section 46. Accordingly, transistor Q1 oscillates at a 205 KHz rate producing a sinusoidal output signal at point 49 at the collector thereof.

Whenever a logic 0 level output is provided by the shift register 33, transistor Q2 is rendered conductive providing a low impedance path for point 44 through diode CR1 to conductor +V (AC ground) causing transistor Q1 to oscillate at a 195 KHz rate.

Wave Shaping Circuit

Figures 6, 6A, 6B:
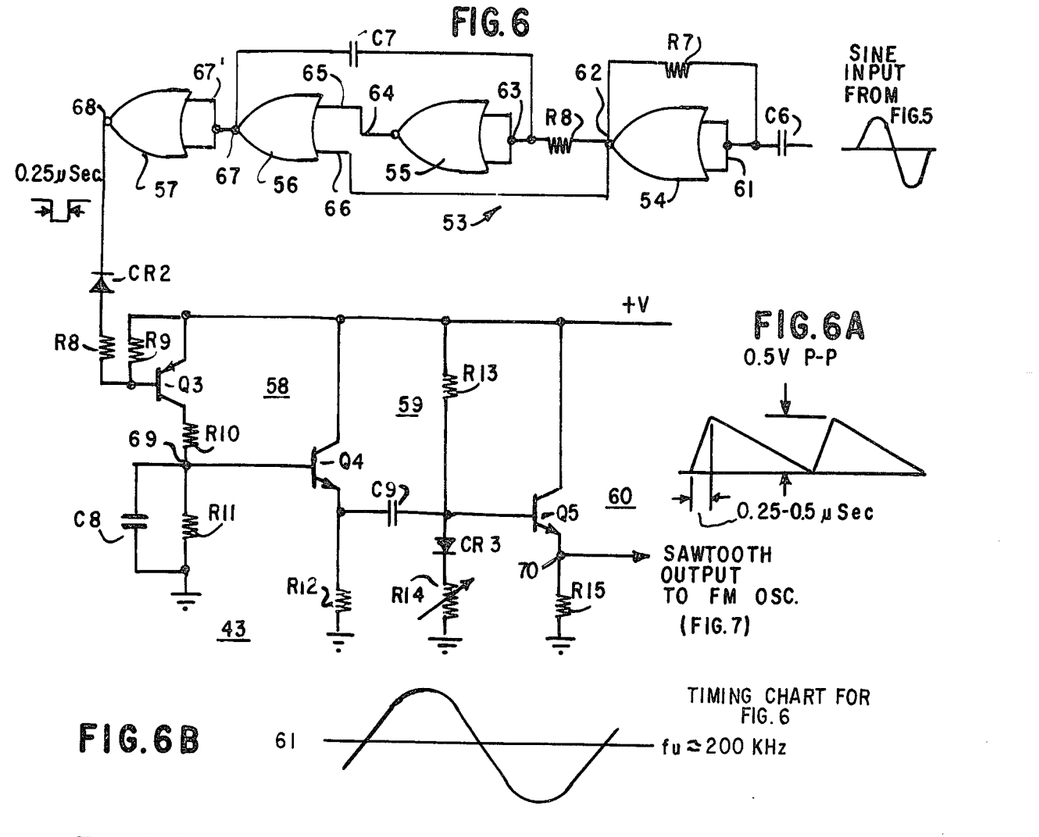
FIG. 6 is a schematic circuit diagram of a wave shaping circuit of the transmitter shown in FIG. 2.
FIG. 6A shows the output waveform of the wave shaping circuit shown in FIG. 6.
FIG. 6B shows the wae form of the signal output of the wave shaping circuit shown in FIG. 6.

Referring to FIG. 6, there is shown a schematic circuit diagram for the wave shaping circuit 43 which shapes the sine wave output from the 200 KHz oscillator 42 into a sawtooth voltage waveform shown in FIG. 6A. The wave shaping circuit 43 includes a plurality of CMOS gate stages 53, including NOR gates 54–57, a charging stage 58, including transistor Q3, an emitter follower stage 59, including transistor Q4, and an output stage 60, including transistor Q5.

Figure 6C:
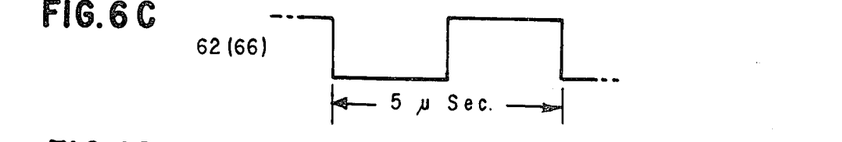
FIGS. 6C–6F show the timing relationships for signals of the wave shaping circuit of FIG. 6.

Gate 54 has an input 61 coupled over capacitor C6 to the output of the voltage controlled oscillator 42. A bias resistor R7 is connected between the input 61 and an output 62 of gate 54, biasing gate 54 in the linear region. Gate 54 converts the sine wave input, shown in FIG. 6B, into a rectangular waveform of approximately 50% duty cycle, as shown in FIG. 6C.

The output 62 of the gate 54 is connected over a resistor R8 to an input 63 of gate 55. The output 64 of gate 55 is connected to an input 65 of gate 56 which has a second input 66 connected to the output 62 of gate 54. A capacitor C7 is connected between the input 63 of gate 55 and an output 67 of gate 56.

Figure 6D:
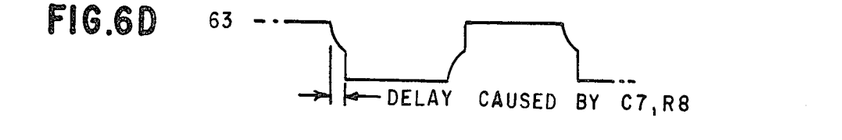
Figure 6E:
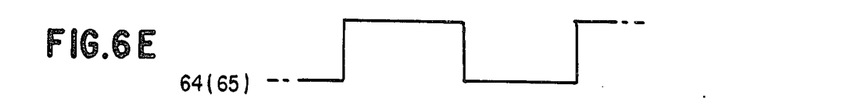
Figure 6F:
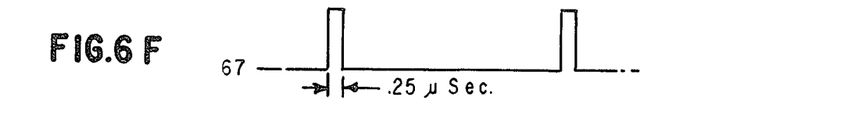

Gates 55 and 56 form a pulse generating circuit which provides a positive pulse of approximately 0.25 microseconds, as determined by the value of capacitor C7 and resistor R8. Referring to FIG. 6D, the effect of resistor R8 and capacitor C7 is to cause a delay of 0.25 microseconds in the signal (FIG. 6E) applied to the input 65 of gate 56 relative to the signal (FIG. 6C) supplied to the other input 66 of gate 56. Accordingly, a positive going pulse of 0.25 microseconds (FIG. 6F) is generated for each negative going transition of the rectangular waveform provided at the output 62 of gate 54.

The positive pulses provided at the output 67 of gate 56 are extended to an input 67' of gate 57, which is operable as an inverter and buffer to provide the negative going pulses having a pulse width of 0.25 microseconds for each 5 microsecond period of the 195–205 KHz sine wave signals supplied to gate 54. The waveform of the output pulse is shown in FIG. 6.

The negative pulses provided at the output 68 of the gate 57 are extended over diode CR2 and a resistor R8 to the base of transistor Q3. The transistor Q3 is biased to be normally non-conducting by resistor R9 which is connected between the base of transistor Q3 and conductor +V. As indicated above, power is supplied from the power switch 36 to the wave shaping circuit 43 over conductor +V whenever the transmitter 26 is enabled. The emitter of transistor Q3 is connected directly to conductor +V. The collector of transistor Q3 is connected to ground over series connected resistors R10 and R11. A capacitor C8 is connected between the junction 69 of resistors R10 and R11 and ground.

Whenever power is applied to conductor +V, each pulse provided at the output of gate 57 renders transistor Q3 conductive for 0.25 microseconds, enabling capacitor C8 to charge to +V over transistor Q3. During the remaining 4.75 microseconds, capacitor C8 discharges through resistor R11 towards ground providing the sawtooth waveform (shown in FIG. 6A) at point 69. The voltage across capacitor C8 drops only by approximately 0.5 volts before being restored to +V by a further pulse provided by gate 57, thereby providing a nearly linearly negative change in the voltage across capacitor C8. The amplitude of the sawtooth waveform is established by the values of capacitor C8 and resistor R11.

The sawtooth waveform is extended to the base of transistor Q4 which comprises emitter follower stage 59. The output of the emitter follower stage 59 at the collector of transistor Q4 is coupled over capacitor C9 to the output stage transistor Q5 which is also connected in emitter follower configuration. The emitter voltage of transistor Q5 establishes the bias point for the FM oscillator 44. The capacitive coupling between transistors Q4 and Q5 enables the bias and sawtooth voltage amplitudes to be independent.

The bias level is adjustable by resistor R14 which is connected in series with diode CR3 between the base of transistor Q5 and conductor +V. The output of the wave shaping circuit 43 is taken from the junction 70 of the emitter of transistor Q5 and resistor R15 which is connected between the emitter of transistor Q5 and ground.

FM Oscillator

Figure 7:
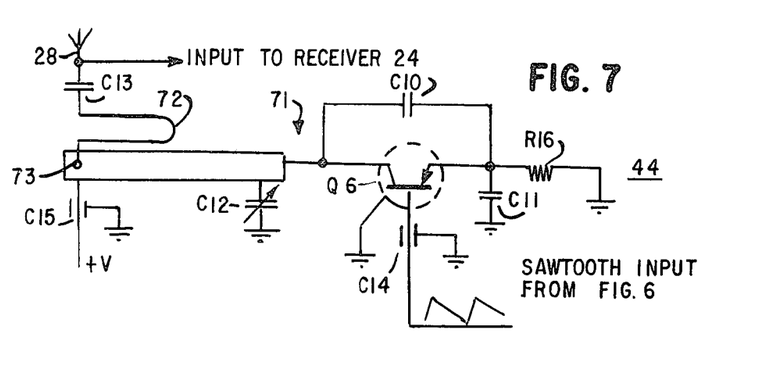
FIG. 7 is a schematic circuit diagram one embodiment of an FM oscillator circuit for the transmitter shown in FIG. 2.

Referring to FIG. 7, there is shown a schematic circuit diagram of the FM oscillator 44. The FM oscillator 44 comprises a transistor Q6 and a tuning circuit including a capacitor C10 connected between the collector and the emitter of transistor Q6 and a quarter-wavelength stub 71 of a stripline section which includes lumped capacitances indicated as capacitor C12. The quarter-wavelength stub 71 provides a parallel resonant circuit for the oscillator 44. The stripline section 71 provides a broadly tuned LC circuit having a center frequency of 400 MHz. A resistor R16 connected between the emitter of transistor Q6 and ground determines the operating point for transistor Q6. The base of transistor Q6 is connected to the output of the wave shaping circuit 54 (FIG. 6) at the emitter of the output transistor Q5.

As indicated above, bias and FM modulation are accomplished by the sawtooth woltage waveform (FIG. 6A) supplied to the base of transistor Q6 by the wave shaping circuit 43. The output from the FM oscillator 44 is obtained via coupling loop 72 which is placed over the quarter-wavelength resonant circuit 71. A capacitor C13, which is connected between the pickup loop 72 and the transponder antenna 20, isolates the pickup loop 72 from the collector supply voltage of transistor Q6 which is extended from conductor +V to terminal 73 of the resonant circuit 71.

In operation, when power is applied to conductor +V, the 200 KHz oscillator 42 and associated wave shaping circuit 43 provide sawtooth drive signals to the base of transistor Q6, varying the collector to emitter voltage of transistor Q6. The resulting change in collector capacity of transistor Q6 causes the oscillator frequency to vary, thus providing for FM modulation of the oscillator Q6.

Figure 7A:
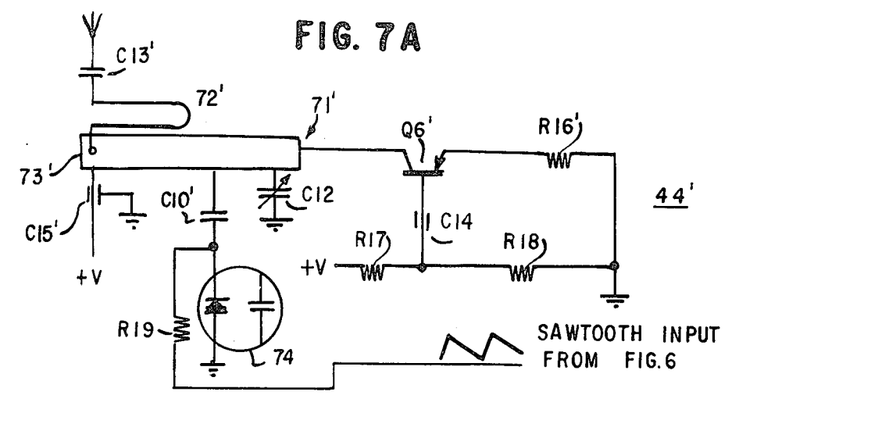
FIG. 7A is a schematic circuit diagram of a further embodiment of an FM oscillator circuit for the transmitter shown in FIG. 2.

Referring to FIG. 7A, there is shown a schematic circuit diagram for a further embodiment of an FM oscillator 44' for use in the transmitter 26. The FM oscillator 44' is generally similar to the FM oscillator 44 shown in FIG. 7, but differs in that a fixed bias is applied to the oscillator transistor and the sawtooth drive signals are applied to the resonant circuit by way of a variable reactance device. As shown in FIG. 7A, a fixed bias is supplied to the base of oscillator transistor Q6' by resistors R17 and R18 which are connected in series between conductor +V and ground. The sawtooth output of the wave shaping circuit 43 is applied to the tuning circuit 71' over a resistor R19. The tuning circuit 71' includes a variable reactance device 74, embodied as a varactor diode. The varactor diode 74 has a cathode connected over a capacitor C10' to the stripline 71'. The resistor R19 is connected between the junction of capacitor C10' and the cathode of the varactor diode 74. The anode of the varactor diode 74 is connected to ground.

In operation, when power is applied to conductor +V, the 200 KHz oscillator 42 and associated wave shaping circuit 43 provide sawtooth drive signals to the anode of the varactor diode 74 varying the junction capacitance of the varactor diode 74. The resulting change in capacity of the varactor diode 74 causes the oscillator frequency to vary providing FM modulation for the oscillator Q6'.

Figure 8:
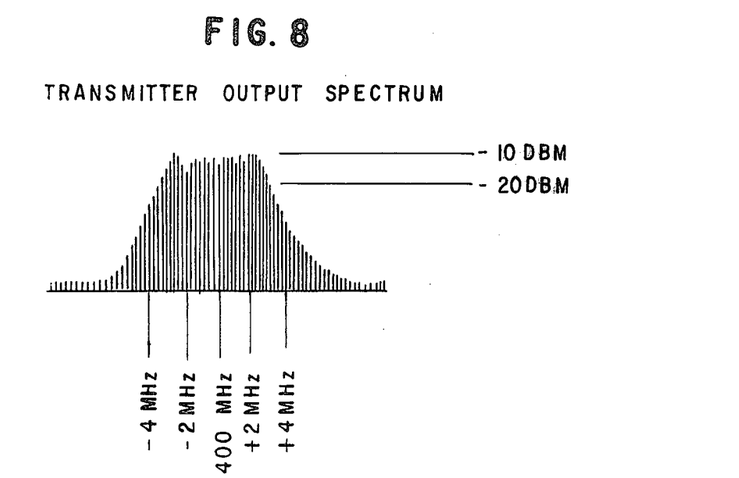
FIG. 8 is a graphical representation of the output spectrum of the transponder transmitter shown in FIG. 2.

The output spectrum generated by the modulating waveform is shown in FIG. 8. Sidebands are separated by 200 KHz, the modulating frequency, Peak sideband power is approximately −10dbm. The FM oscillator 44 does not require temperature stabilization since the broad spectrum, which in the exemplary embodiment is greater than 6 MHz, allows considerable leeway in the tuning of the receiver 18 of the interrogate source 13. The width of the output spectrum is determined by the amplitude of the sawtooth signal which drives the FM oscillator 44.

The output spectrum with sideband frequencies coded to represent trhe data provided by the data source 11 is coupled to the transponder antenna 28 and radiated to the interrogate source 13.

Interrogate Source Receiver

Figure 9:
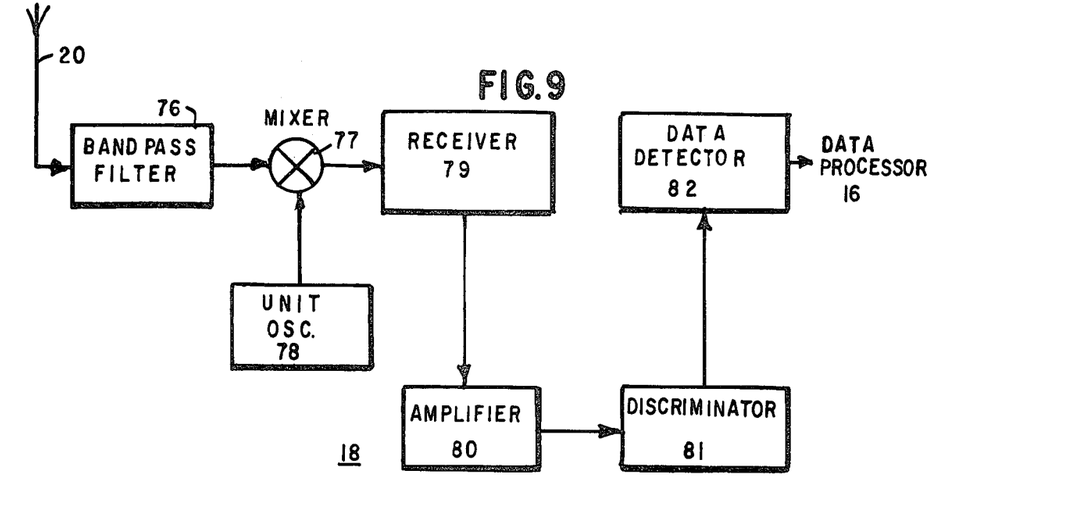
FIG. 9 is a block diagram of the receiver of the interrogate source shown in FIG. 1.

A block diagram of the interrogate source receiver 18 is shown in FIG. 9. The incoming receiver bandpass is determined by a tunable bandpass filter 76 which is normally set at 400 MHz. This allows the output signal provided by the transponder 14 to be received, yet highly attenuates the 451 MHz interrogate signals generated by the interrogate source transmitter 17. One commercially available filter suitable for this purpose is the Model TTF 250 Tunable Filter available from Telonic.

Data is recovered by passing any two adjacent sidebands through a common receiver where their difference frequency is further demodulated by a 200 KHz discriminator. In the present illustration, a 400 KHz initial receiver bandwidth is used to assure that at least two of the transmitted sidebands are received at all times.

Figure 3B:
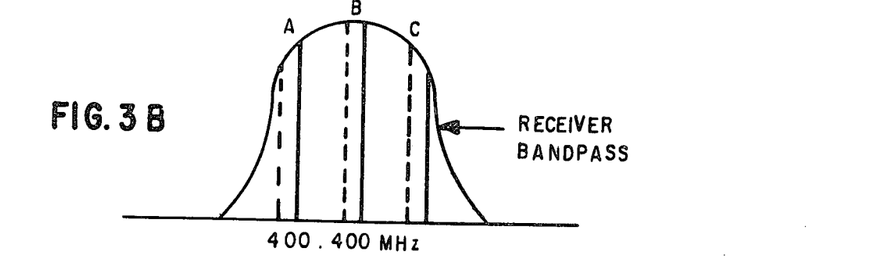
FIGS. 3B and 3C show tuning conditions for the interrogate source receiver shown in FIG. 1.
Figure 3C:
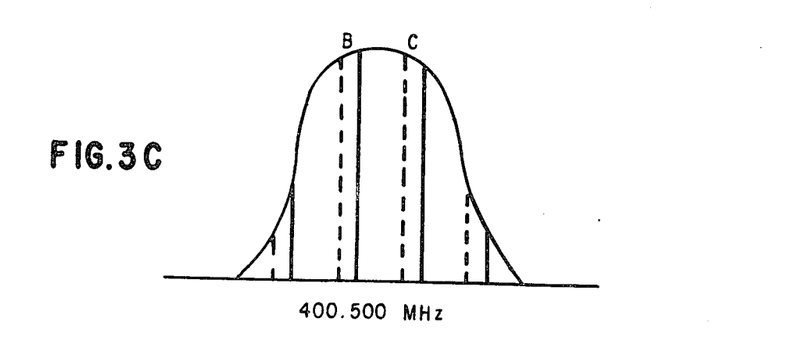

Referring to FIGS. 3A–3C, there are two possible receiver tuning conditions. As shown in FIG. 3B, the receiver 18 of the interrogate source 13 is tuned to a center frequency of 400.400 MHz and three sidebands A, B, and C are within the passband of the receiver 18. As can be seen from FIG. 3A, sidebands A, B and C are at frequencies 400.205, 400.410 and 44.615 MHz, respectively, for logic 1 data, and at frequencies 400.195, 400.390 and 400.585 MHz, respectively, for logic 0 data.

The sideband components indicated as A and C are symmetrically distributed about the sideband B which is at a frequency of 400.410 MHz. In the case where the receiver 18 is tuned so that these sidebands are within the passband of the receiver 18, any pair of adjacent sidebands may be detected to recover the transmitted intelligence without suppression of the 200 KHz modulating component.

In FIG. 3C, the receiver 18 is tuned to a center frequency of 400.500 MHz and two sidebands B and C at frequencies 400.410 (400.390) MHz and 400.615 (400.585) MHz are within the passband of the receiver 18.

Digressing, if sine wave modulation were used to effect the generation of the sidebands of the carrier frequency provided by the transponder transmitter 26, suppression of the 200 KHz modulation would result under some circumstances. The phasing of the components A and C is such that when the two components are inter-mixed with sideband B, a cancellation would result. In accordance with the present invention, wherein sawtooth modulation is employed sideband phasing allows the receiver 18 to be tuned continuously as shown in FIGS. 3B or 3C to receive either three or two sidebands without suppression of the 200 KHz modulating component. The interrogate source receiver 18 can be tuned to any frequency within the 6 MHz spectrum transmitter to receive the transmitted data. Also, data recovery is not dependent upon transmitter or receiver stability.

Referring again to FIG. 9, the carrier sidebands passed by the filter circuit 76 are extended to a mixer circuit 77. An oscillator circuit 78 supplies a reference signal to the mixer 77. The balanced mixer 77 and the oscillator 78 translate the transponder reply spectrum to the frequency range of a receiver 79. The mixer 77 may be the type HP 10514 commercially available from Hewlett Packard. The oscillator 78 mey be the type GR 1209B, commercially available from General Radio. The receiver 79 may by the type 903A receiver commercially available from Communication Electronics.

The 400 MHz signal spectrum received is converted to a 60 MHz range by the mixer 77 and the oscillator 78. The reveiver 79 is used as a tunable first IF amplifier with a broad bandpass, nominally 300 KHz, thus assuring the reception of at least two of the transponder sidebands at all times. Normally, the receiver 79 is tuned to the center of the 6 MHz spectrum transmitted by the transponder 14. Whenever interference is present in the 300 KHz spectrum to which the receiver 79 is tuned, the receiver frequency can be shifted up or down to a clear channel for receiver operation. A multiple channel receiver could also be used to alleviate the need for tuning by the operator. Also, the interrogate source receiver 18 may include a low noise preamplifier ahead of the mixer 77 to improve the system noise figure.

At least two adjacent transponder sidebands are simultaneously received and intermixed in the receiver 79 to produce the 200 KHz difference frequency. The resultant signal is amplified by amplifier 80 which may by the type HP 461A amplifier, commercially available from Hewlett Packard. The amplified signals are extended to a 200 KHz discriminator 81 which produces a two level signal in response to the data modulation provided by the transponder transmitter 26. A discriminator suitable for this purpose is shown in FIG. 10.

Figure 10:
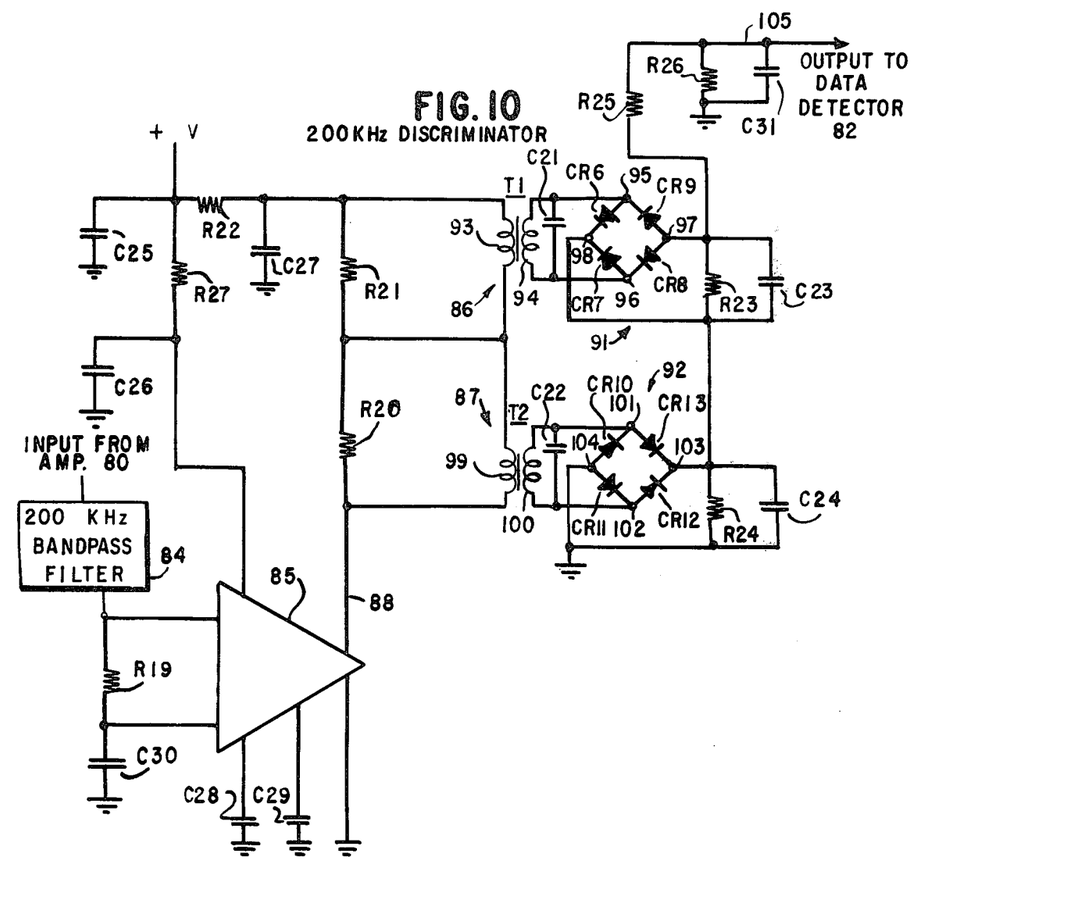
FIG. 10 is a schematic circuit diagram of a discriminator for the receiver shown in FIG. 9.

Referring to FIG. 10, The discriminator circuit 81 includes a bandpass filter 84 having a 200 KHz passband, an amplifier-limiter circuit 85, and a pair of serially connected resonant circuits 86 and 87. The bandpass filter 84 is connected between the output of the amplifier 80 and an input of the amplifier-limiter circuit 85. The amplifier-limiter circuit 85 may be the type CA3012 available from RCA. The output of the amplifier-limiter circuit 85 is connected over resistors R20–R22 to a power source +V' Resistor R27 and capacitors C25–C30 provide filtering for the amplifier-limiter circuit 85.

Resonant circuit 86 includes a transformer T1, a capacitor C21, and a full wave rectifier bridge network 91, including diodes CR6–CR9. Transformer T1 has a first winding 93 connected across resistor R21 and a second winding 94 connected across inputs 95 and 96 of the bridge network 91. Capacitor C21 is connected in parallel with winding 94. A load resistor R23 is connected across outputs 97 and 98 of the bridge network 91.

Resonant circuit 87 includes a transformer T2, a capacitor C22, and a full wave rectifier bridge network 92, including diodes CR10–CR13. Transformer T2 has a first winding 99 connected across resistor R22, and a second winding 100 connected across inputs 101 and 102 of bridge network 92. Capacitor C22 is connected in parallel with winding 100. A load resistor R24 is connected across outputs 103 and 104 of the bridge network 92.

Load resistors R23 and R24 are connected in series with a resistor R25 between the output 105 of the discriminator 81 and ground.

In operation, the signal output of the amplifier 80 is extended over the bandpass filter 84 to amplifier-limiter circuit 85 which amplifies and limits the received signals. The resultant signals are extended to the resonant circuits 86 and 87 over resistors R21 and R22 which equalize the amplitudes of the signals extended to the resonant circuits 86 and 87.

Resonant circuit 86 is tuned to approximately 210 KHz and resonant circuit 87 is tuned to approximately 190 KHz. Diodes CR10–CR13 of bridge network 92 are oppositely poled relative to diodes CR6–CR9 of the bridge network 91 such that the signal output appearing across resistor R24 is negative relative to the signal output appearing across resistor R23. The outputs of the resonant circuits 86 and 87 are added such that whenever a frequency of 200 KHz, for example, is extended to the resonants circuits 86 and 87, the signals appearing across resistors R23 and R24 are equal in amplitude and opposite in polarity such that the net output signal appearing at output 105 of the discriminator 81 is at zero potential or ground.

When a signal of a frequency of 205 KHz is extended to resonant circuits 86 and 87, the net output signal of the discriminator 81 is positive and when a signal of frequency 195 KHz is extended to the resonant circuits 86 and 87, the net output signal of the discriminator 81 is negative.

The high impedance output of the discriminator 81 is converted to the appropriate logic 1 and logic 0 levels by a data detector circuit 82 and the logic signals are then extended to the data processor 16, shown in FIG. 1.

I claim:

1. In a data transmission system for obtaining information from at least one data source, said system including an interrogate source means having first transmitter means and first receiver means, said first transmitter means being operable to generate interrogate signals for transmission to the location of said data source, and transponder means associated with said data source, said transponder means comprising second receiver means for receiving said interrogate signals, data means connected to said data source and controlled by said second receiver means to provide data signals representing the information provided by said data source, and second transmitter means including first oscillator means for generating a carrier signal at a predetermined frequency and drive means responsive to said data signals to provide linearly varying drive signals having unequal rise and fall times for said first oscillator means to effect the generation of a plurality of sets of sideband signals representing said information, wherein the sideband signals of each set are approximately equal in amplitude over a predetermined spectrum to thereby enable the simultaneous reception of at least two adjacent sidebands by said first receiver means.

2. A data transmission system as set forth in claim 1 wherein said data means includes means operable to provide logic level data signals at first and second levels in a sequence coded to represent said information, and wherein said drive means includes first means responsive to data signals at said first level to provide output signals at a first frequency for effecting the generation of a first set of sideband signals differing in frequency in correspondence with said first frequency, said first means being responsive to data signals at a second frequency for effecting the generation of a second set of sideband signals differing in frequency in correspondence with said second frequency.

3. In a data transmission system for obtaining information from at least one data source, said system including an interrogate source means having first transmitter means and first receiver means, said first transmitter means being operable to generate interrogate signals for transmission to the location of said data source, and transponder means associated with said data source, said transponder means comprising second receiver means for receiving said interrogate signals, data means connected to said data source and controlled by said second receiver means to provide logic level data signals at first and second levels in a sequence representing the information provided by said data sourcee, and second transmitter means including first oscillator means for generating a carrier signal at a predetermined frequency and drive means including second oscillator means responsive to said logic level data signals at said first and second levels to provide sinusoidal output signals at respective first and second frequencies, and wave shaping means responsive to the sinusoidal output signals provided by said second oscillator means to provide sawtooth waveform drive signals at said first and second frequencies for said first oscillator means to effect the generation of first and second sets of sideband signals representing said information, the sideband signals of said first and second sets differing in frequency in correspondence with said first and second frequencies respectively, and the sideband signals of each set being approximately equal in amplitude over a predetermined spectrum to enable the simultaneous reception of at least two adjacent sidebands by said first receiver means.

4. In a data transmission system including a mobile interrogate source including means for generating interrogate signals for transmission to the location of a data source to effect the generation of reply data signals representing information provided by said data source, said interrogate source including first receiver means for receiving said reply data signals, and transponder means associated with said data source, said transponder means comprising second receiver means for receiving the interrogate signals, data means connected to said data source and controlled by said second receiver means to provide bilevel data signals in a sequence representing said information, and transmitter means including oscillator means for generating a carrier signal and drive means responsive to said data signals to provide linearly varying drive signals at first and second frequencies for said oscillator means to effect the generation of first and second sets of sideband signals representing said information wherein the sideband signals of each set are approximately equal in amplitude over a predetermined portion of an output spectrum for said transmitter means, said first receiver means being tuned to simultaneously receive at least two adjacent sideband signals in a preselected portion of the output spectrum, and said first receiver means being operable to recover the information from said two sideband signals.

5. A data transmission system as set forth in claim 4 wherein the sideband signals of said first and second sets differ in frequency by said first and second frequencies, respectively, and wherein said first receiver means includes first means responsive to at least two adjacent sideband signals to produce a signal corresponding to the difference in frequency between said two sideband signals.

6. A data transmission system as set forth in claim 4 wherein each set of sideband signals includes at least three sideband signals which are approximately equal in amplitude and wherein said first receiver means is tuned to receive said three sideband signals, said first receiver means including means responsive to first and second ones of said three sideband signals to produce a signal corresponding to the difference in frequency between said first and second sideband signals.

7. In an RF transmitter circuit responsive to information signals to provide RF data signals representing information to be transmitted, the improvement comprising first oscillator means for generating a carrier signal, second oscillator means controlled by said information signals to provide sinusoidal output signals at first and second frequencies, and wave shaping means responsive to said output signals to provide linear drive signals at said first and second frequencies for said first oscillator means for modulating said carrier signal thereby effecting the generation of sideband signals of said carrier signal representing said information, the sideband signals being approximately equal in amplitude over a predetermined output spectrum.

8. A transmitter circuit as set forth in claim 7 wherein said wave shaping means includes control means responsive to said sinusoidal output signals to provide a control pulse for each cycle of the sinusoidal output signals, and output means responsive to each control pulse to provide a sawtooth waveform output.

9. A data transmitter circuit as set forth in claim 8 wherein said output means includes means for establishing the amplitude of said drive signals and therefore the width of the output spectrum provided by said first oscillator means.

10. A transmitter circuit as set forth in claim 8 wherein the ratio of the rise time to the fall time of each sawtooth output signal is determined by the width of said control pulse and wherein said control means includes means for establishing the pulse width for said control pulse to provide a risetime to falltime ratio in the range of 10 to 20.

11. A transmitter circuit as set forth in claim 8 wherein said first oscillator means comprises semiconductor means having at least a control electrode and an output electrode, resonant circuit means connected to said output electrode to establish the carrier frequency for said first oscillator means, said control electrode being connected to an output of said wave shaping means to receive said sawtooth output signals.

12. A transmitter circuit as set forth in claim 8 wherein said first oscillator means comprises semiconductor means having at least a control electrode and an output electorde, bias means connected to said control electrode for establishing a fixed bias for said semiconductor means, resonant circuit means including variable reactance means connected to said output electrode to establish the carrier frequency for said first oscillator means, and circuit means for extending said sawtooth output signals to said variable reactance means.

13. A transmitter circuit as set forth in claim 7 wherein said information signals comprise bilevel data signals, said second oscillator means being controlled by said bilevel data signals to provide output signals at first and second frequencies and wherein said wave shaping means is responsive to said output signals to provide drive signals at said first and second frequencies to thereby effect the generation of first and second sets of sideband signals.

14. A transmitter circuit as set forth in claim 13 wherein the sideband signals of said first set differ in frequency in correspondence with said first frequency and the sideband signals of said second set differ in frequency in correspondence with said second frequency.

15. In an RF data transmitter circuit responsive to bi-level data signals representing information to be transmitted for providing RF data signals representing said information, the improvement comprising first oscillator means for generating a carrier signal, second oscillator means responsive to a data signal at a first level to provide a sinusoidal output signal at a first frequency and responsive to a data signal at a second level to provide a sinusoidel output signal at a second frequency, and wave shaping means including control means responsive to each cycle of the output signals provided by said second oscillator means to provide a control signal, output means responsive to each control signal to provide a sawtooth waveform output signal, the frequency of the sawtooth output signal being determined by the frequency of the sinusoidal signal supplied to said wave shaping means, said sawtooth waveform signals being supplied to said first oscillator means to effect the generation of a first set of sideband signals whenever sawtooth signals at said first frequency are provided, and to effect the generation of a second set of sideband signals whenever sawtooth signals at said second frequency are provided.

16. In an RF transmitter circuit responsive to information signals to provide RF data signals representing information to be transmitted, the improvement comprising oscillator means for generating a carrier signal at a predetermined frequency, and drive means controlled by said information signals to provide linearly varying amplitude drive signals at first and second frequencies for said oscillator means for modulating said carrier signal to effect the generation of respective first and second sets of sideband signals of said carrier signal representing said information, said drive signals having unequal rise and fall times whereby the sideband signals are approximately equal in amplitude over a predetermined output spectrum.

17. In a data transmission system, transmitter means at a first location for transmitting information provided by a data source means at said first location to a receiver means at a second location, said transmitter means comprising first oscillator means operable to generate a carrier signal, second oscillator means connected to said data source means and controlled by data signals representing said information provided by said data source means to provide sinusoidal output signals at predetermined frequencies, and wave shaping means responsive to said sinusoidal output signals to provide linearly varying drive signals having unequal rise and fall times for said first oscillator means to effect the generation of sets of sidebands of said carrier signal representing said information for transmission to said receiver means.

18. A data transmission system as set forth in claim 17 wherein said first oscillator means comprises semiconductor means having at least a control electrode and an output electrode, resonant circuit means connected to said output electrode to establish the carrier frequency for said first oscillator means, said control electrode being connected to an output of said wave shaping means to receive said drive signals.

19. A data transmission system as set forth in claim 17 wherein said wave shaping means includes means for establishing the amplitude of said varying drive signals at a predetermined value to thereby establish the width of the output spectrum of said transmitter means.

20. A data transmission system as set forth in claim 17 wherein said first oscillator means comprises semiconductor means having at least a control electrode and an output electrode, bias means connected to said control electrode for establishing a fixed bias for said semiconductor means, resonant circuit means including variable reactance means connected to said output electrode to establish the carrier frequency for said first oscillator means, and circuit means for extending said drive signals to said variable reactance means.

21. A data transmission system as set forth in claim 17 wherein said wave shaping means includes control means responsive to said sinusoidal output signals to provide a control pulse for each cycle of the sinusoidal output signals, and output means responsive to each control pulse to provide a sawtooth waveform output signal.

22. A data transmission system as set forth in claim 21 wherein the ratio of the rise time to the fall time of each sawtooth output signal is determined by the width of said control pulse and wherein said control means includes means for establishing the pulse width for said control pulse to provide a risetime to falltime ratio in the range of 10 to 20.

* * * * *